Patented June 8, 1943

2,321,007

UNITED STATES PATENT OFFICE 2,321,007

METHOD OF PREPARING PIGMENT MATERIAL

Samuel Cabot, Jamaica Plain, Mass., assignor to Samuel Cabot, Inc., Boston, Mass., a corporation of Massachusetts No Drawing. Application June 13, 1940, Serial No. 340,321

9 Claims. (Cl. 106—262)

This invention relates to the treatment of pigments used in coloring plastics and dispersed solids, and in paints, enamels, stains, dyes, lacquers or like coloring media.

In general, the object of my invention is to produce highly colloidal dispersions of the pigment particles and to maintain them permanently in such highly colloidal state against their tendency to return to the less colloidal condition in which they existed prior to my treatment.

Experience has shown that when pigments are produced in dry form in the colloidal range of sizes, whether by condensing a fume in a gaseous atmosphere, by disintegrating a solid by mechanical means, or by precipitating from solution and subsequently drying and disintegrating, there will remain on each pigment particle an adsorbed layer which, unless removed and the pigment particles protected against re-adsorption thereof, will tend to prevent the particles from being permanently dispersed or maintained in a state of highly colloidal fineness.

My present invention is primarily concerned with the removal from the pigment particles of this strongly adsorbed gas layer, sometimes known as the outside layer of the "Helmholz double layer," or as the "solvated hull," or as the zeta layer adsorbed on the epsilon layer at the interface between a solid and a gas, and although not restricted thereto is chiefly valuable when the ultimate pigment particles are largely in the colloidal range of sizes.

This adsorbed layer cannot be noticeably removed by any slight mechanical force, but according to my invention or discovery can be substantially completely removed by subjecting the pigment particles in dry state to repeated squeezing and friction for a sufficient time and under sufficient pressure and friction to squeeze, rub, or erode off the adsorbed layer on each ultimate particle so that the denuded surface of each particle will be attracted to and cling against the similarly denuded surfaces of other particles of like size, producing clumping or agglomerations of the ultimate particles in which the mutually contacting denuded surfaces of the clumped particles protect each other against any appreciable re-adsorption of gas layers.

According to accepted theory, this tendency of the ultimate particles, when freed of their adsorbed layers, to agglomerate and cling to each other is due to attractive forces, such as the "Vanderwal" forces, and also to the unsatisfied valence forces found in colloidal particles due to their incomplete lattice structure.

Although the denuded outside surfaces of the ultimate particles in any agglomeration of particles will re-adsorb a gas layer if exposed to atmosphere or other gases for a sufficient time, (due to the tendency of these surfaces to satisfy themselves) the other denuded but mutually-contacting surfaces of the ultimate particles in such agglomeration of particles mutually seal off one another against contact with air and re-adsorption of gas layers.

These mutually-contacting denuded surfaces in any agglomeration of particles may be described as surfaces which are not re-adsorptive as long as they are in mutual contact with each other and thus remain satisfied. This is proven by the fact that a fresh batch of my treated pigment (as lampblack, for example) will adsorb water strongly, loses its power of adsorption when exposed to air or other gases, but on scraping off its outer surface the fresh surface thus exposed will adsorb water as strongly as did its original surface when fresh. Consequently, my treated pigment has a very much higher apparent density that the same pigment not so treated, and wets very much more readily with water or other liquids while requiring comparatively little of the water or other liquid to disperse it. In fact, in the case of lampblack, my treatment changes the lampblack from a water repellant pigment to a water absorbing pigment. The liquid wedges the particles apart and wets the surfaces, forming a Zeta layer of it, or especially of any ingredients of it which tend most strongly to reduce surface tension, such as colloidal micelle.

In practicing my invention I proceed as follows: The selected pigment or combination of pigments, preferably in the colloidal range of sizes, is placed in dry state in the pan of a conventional edge runner or equivalent machine and subjected to a period of continuous squeezing and friction between the heavy wheel of the edge runner and the wall of the pan.

The time of treatment and the pressure and friction exerted will depend upon the character of the pigment or pigment combination and the type of apparatus employed. I have obtained satisfactory results using an edge runner, the wheel of which weighs about 800 pounds, travels on an arm about 2 feet in length, and rotates at about 30 R. P. M. so as to have a surface speed of approximately 360 feet per minute. The apparatus is equipped with radial blades or scrapers which function to constantly turn and re-feed the pigment into the path of the wheel so that the pigment is constantly squeezed and rolled against the side of the pan or chamber within which the wheel runs. The wheel exerts a pressure of at least 120 pounds per square inch and this pressure in combination with the continuous scraping and turning action has a shearing and frictional effect on the pigment as it is exposed over and over again in thin layers to these forces.

For most pigments a treatment of approximately 10 minutes is sufficient to substantially wholly remove the gas layers from the pigment particles and to cause the agglomeration or clumping together of the ultimate pigment particles in the mutually protective relation hereinbefore described.

Where the pigment under treatment is a black carbon pigment consisting of particles in the colloidal range of sizes of lampblack, carbon gas black, or like products of the incomplete combustion of hydrocarbon or other organic material carrying adsorbed layers of gas as an incident to their manufacture, the pigment after treatment as above described will be found to be in a caked or agglomerated condition with the denuded surfaces (except the outside exposed surfaces) of the ultimate pigment particles in any agglomeration of particles mutually protected and satisfied by their mutual contact with each other, and hence will remain indefinitely in a protected but highly absorbent state.

Although it is difficult to state percentages accurately because these depend upon the type of pigment treated, it is a fact that my treated pigment is markedly more fluid in a liquid than the same pigment not treated, and its oil absorption (meaning the amount of oil necessary to make a paste) is greatly reduced. For example, carbon gas black treated in accordance with my invention shows an oil absorption of 45 drops as compared to 65 drops for the same material not so treated. Lampblack treated in accordance with my invention shows an oil absorption of 39 drops as compared with 66 drops with the same material not so treated. And a zinc-titanium oxide mixture treated in accordance with my invention shows an oil absorption of 34 drops as compared to 40 drops of the same material not so treated.

Both the carbon gas black and the lampblack when treated in accordance with my invention, show a reduction in bulk in the order of approximately 1 to 10 as compared with the same pigments not so treated. The importance of this will be realized when it is remembered that the art has constantly tried to find ways of compressing these materials so that a greater weight might be packed in a container of given size and so that the packed black would not fly around and dirty or otherwise contaminate other goods in a rubber or paint factory or the like.

My treated carbon gas black, lampblack, or other fume pigment may be used in coloring plastic compositions. For example, in the manufacture of rubber goods, such as shoe soles, automobile tires, etc., it may be introduced into the rubber mill along with the rubber and mechanically processed to cause a complete dispersion of the treated pigment throughout the rubber, such processing being followed by a dispersion of the entire system in mineral naphtha or other dispersion medium or solvent, with or without the addition of conventional vulcanizing agents at the time of milling the mixture.

Procedure and proportions will necessarily vary according to the characteristics wanted in the final article, as for example, waterproofness, tensile strength, hardness, flexibility or resilience, resistance to weather, and inertness against acids. In the mechanical processing of my treated pigment with rubber or other dispersible plastic, the rubber, being adhesive and cohesive, becomes a disruptive force which under the squeezing and friction effect of the rolls of the rubber mill pulls apart substantially all of the pigment agglomerates and envelopes the ultimate pigment particles with protective colloidal films which prevent subsequent appreciable re-adsorption of any gas layers.

As an illustrative example of the foregoing I may add 10 parts by weight of my dry milled lampblack, or carbon gas black pigment, to 100 parts of crepe rubber, mill the mixture until the treated material is thoroughly dispersed through the rubber and then disperse the milled mass in a suitable dispersion medium or solvent.

Instead of rubber, I may use other adhesive-cohesive organic colloidal dispersing agents. Examples of useable adhesive-cohesive colloidal dispersing agents include, in addition to the various types of rubber and rubber mixtures now commonly used in the manufacture of rubber or rubber-like articles, such oils and fixatives as are used in the manufacture of certain paints, such as polymerized drying oils, and other polymerized and condensed organic material or natural organic colloids.

Examples of useable dispersion media for these adhesive-cohesive colloidal dispersing agents are the hydrocarbons and other organic liquids, the higher alcohols, esters, ketones, phenols, and carbon bisulphide.

In making a paint I proceed as follows: Any suitable pigment, in dry state and preferably in the colloidal range of sizes or any combination of such pigments, is first treated in the edge runner, as hereinbefore described, to remove the adsorbed gas layers from the ultimate pigment particles, following which and while the pigment particles are still in the edge runner and prior to any appreciable re-adsorption of gas layers by the pigment particles, I slowly pour an adhesive-cohesive colloidal dispersing agent, such as a polymerized drying oil or the like, into the edge runner and continue the dry milling until such time as the disruptive or push-pull effect of the adhesive-cohesive colloidal dispersing agent has pulled apart the agglomerated pigment particles and caused them to be enveloped by films of such adhesive-cohesive material.

In this phase of my procedure, the time will vary with operating conditions and the type of pigment and adhesive-cohesive colloidal dispersing agent employed. Where the pigments are conventional paint pigments, such as titanium oxide and barium sulphate, and the adhesive-cohesive colloidal dispersing agent is a polymerized drying oil such as disclosed in my prior patents, Nos. 1,662,999 and 1,791,119 this phase of my process will ordinarily be continued for about fifteen minutes, following which the now thoroughly dispersed but semi-plastic mass may be brought to the desired consistency by slowly pouring into the edge-runner a dispersion medium, such as a hydrocarbon thinner, and continuing the milling until the desired consistency is reached. For such dispersion medium I have used a product now on the market known as "Varnolene," although as heretofore suggested other thinners may obviously be used. The time of this final dispersing step will vary depending upon the nature of the thinner and the consistency wanted in the final product, but usually does not exceed five minutes, after which the paint is in condition to be packaged in cans or other containers.

In producing a blue paint of great covering power and extreme brilliance, I mix in dry state in the edge-runner one part by weight of ferric ferrocyanide, two parts by weight of zinc oxide, and two parts by weight of a co-precipitated product consisting of titanium oxide (25 parts by weight) and barium sulphate (75 parts by weight). When this mixture has been sufficiently dry-milled to remove substantially all of the adsorbed gas layers on the pigment particles, I add one part by weight of the adhesive-cohesive colloidal dispersing agent and continue the milling until the mass has been sufficiently dispersed, whereupon I add one part by weight of turpentine, Varnolene or other hydrocarbon thinner and continue the milling until the mixture has been brought to the desired consistency.

Another satisfactory paint consisted of two parts by weight of dry-milled titanium oxide, one part by weight of polymerized drying oil, and one part by weight of turpentine. If zinc oxide is used as the pigment, the proportion of the pigment to the adhesive-cohesive colloidal dispersing agent would be higher by weight.

A satisfactory stain consisted of two parts by weight of zinc oxide and $2/100$ parts by weight of lamp-black, dry-milled together as heretofore described, four parts by weight of polymerized drying oil, and 30 parts by weight of turpentine.

Other advantages of my treated pigment when incorporated in a paint, stain or the like, are that the resulting product is markedly more fluid, exhibits a greater gloss, and a longer retention of the gloss with less tendency to chalk, as well as greater flexibility, due to the fact that the adsorbed gas layers have been removed from the pigment particles and consequently there is no entrapped air in the paint.

My paint is less expensive, because it requires less of the expensive polymerized drying oil and is more waterproof, because of the removal of the gas layers from the pigment particles. Its pH is brought in the direction of neutrality without the necessity of giving the product any special treatment for adjusting the pH value. And finally, the pigment dispersion is more completely colloidal, on account of the close adhesion of the dispersing agent to the pigment particles because of the removal of the gas layers.

What I therefore claim and desire to secure by Letters Patent is:

1. The method of preparing a dispersion of pigment particles of colloidal fineness, consisting in working by repeatedly squeezing together under heavy pressure while continuously turning and returning such pigment particles in an unmodified dry state until the mutual abrasion or attrition of the particles on each other during said squeezing rubs off gases adsorbed on the surfaces of each particle and the thus denuded surfaces of the gas-free particles adhere together in mutually protective relation against re-adsorption of gases to establish agglomerates in the form of slivers or clumps or flakes, and of bulk substantially less than that of the same particles before said working, adding a dispersion medium of adhesiveness sufficient to seize upon the outer surfaces of the agglomerates and of cohesiveness sufficient to break up the agglomerates so seized into their constituent particles of colloidal fineness, and kneading the gas free particles in the dispersion medium until the agglomerates are broken up and each isolated individual particle is enveloped and protected by the dispersion medium as a colloidal surface film, said mixture being characterized in that a substantially lesser volume of the dispersion medium is required to disperse the particles and the speed of absorption of the medium by the particles is greatly increased over that of the particles originally.

2. The method of claim 1, in which the pressure applied to the dry pigment during the turning and squeezing step is substantially 120 pounds per square inch.

3. The method of claim 1, in which said dry pigment is turned and squeezed for approximately ten minutes.

4. The method of claim 1, the pressure applied to the dry pigment during turning and squeezing being substantially 120 pounds per square inch and the turning and squeezing continuing for approximately ten minutes.

5. The method of claim 1, in which the particles are carbon black and the turning and squeezing reduces the powdered carbon black to substantially one-tenth of its original bulk.

6. The method of claim 1, and the steps of adding to the mixture a thinner in an amount sufficient to bring the mixture to the desired consistency, and continuing the squeezing and kneading action until such thinner has been completely incorporated in the mixture.

7. The method of claim 1, in which the cohesive dispersion medium includes a polymerized drying oil.

8. The method of claim 1, in which the cohesive dispersion medium includes a rubber product.

9. The method of producing colloidal dispersions of mineral pigments in hydrocarbon liquids in which they are otherwise undispersible, consisting in first subjecting the unmodified mineral pigment in a dry, finely divided state and in thin layers to repeated squeezing and friction under heavy pressure to remove from its individual particles substantially all gases adhering to their surfaces thereby to bring said particles to a state of agglomeration in which they mutually adhere to each other by surface attraction, in then adding to the dry mass of agglomerate a cohesive organic colloidal dispersing agent disruptive of the agglomerated pigment particles and in an amount sufficient to form a continuous film on the particle surfaces to prevent substantial re-adsorption of gases, in continuously kneading the pigment and dispersing medium under pressure to a state of plasticity and the ultimate envelopment of each particle by portions of said organic dispersing agent, and in finally dispersing the mixture in a hydrocarbon liquid.

SAMUEL CABOT.